Feb. 25, 1941. W. A. KUHLMAN 2,232,921
BARREL GAUGE
Filed Nov. 12, 1938
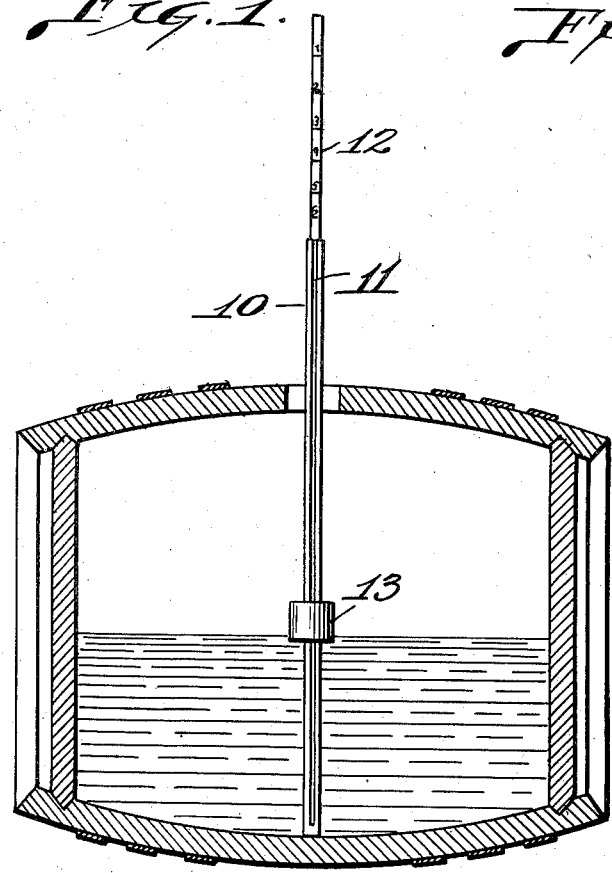
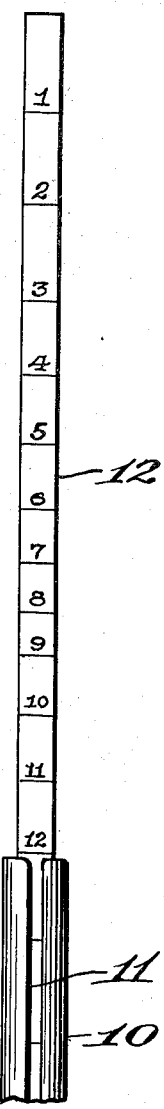
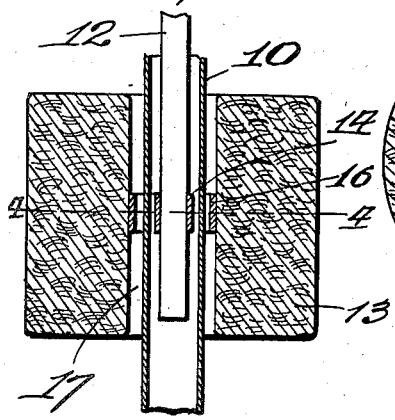
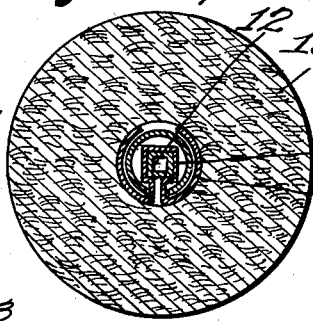
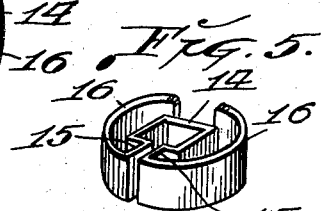
INVENTOR:
WILLIAM A. KUHLMAN.
BY Martin P. Smith, ATTY.

Patented Feb. 25, 1941

2,232,921

UNITED STATES PATENT OFFICE 2,232,921

BARREL GAUGE

William A. Kuhlman, Los Angeles, Calif.

Application November 12, 1938, Serial No. 240,055

2 Claims. (Cl. 73—322)

My invention relates to a barrel gauge and has for its principal object the provision of a relatively simple, practical and inexpensive gauge that may be conveniently employed for ascertaining the liquid contents of barrels, kegs, and other containers utilized for the storage and transportation of liquids, such as wine, liquor, water solvents, chemicals, disinfectants, oil, and the like.

Further objects of my invention are, to provide a barrel gauge that is relatively simple in construction and capable of being easily and conveniently manipulated for gauging the contents of barrels and the like, further, to provide a gauge of the character referred to that includes a float actuated rod associated with a tube that is inserted in the barrel or other container and further, to provide a gauge wherein the float is connected to the calibrated rod with a resilient gripping element that performs its connecting functions without the use of screws, rivets, or other connecting means, or without the use of an adhesive or solder.

With the foregoing and other objects in view, my invention consists in certain novel features of construction and arrangement of parts that will be hereinafter more fully described and claimed and illustrated in the accompanying drawing in which:

Fig. 1 is a vertical section taken lengthwise through a barrel and showing a gauge of my improved construction positioned for use in said barrel.

Fig. 2 is an elevational view of the upper portion of the calibrated rod and a portion of the slotted tube that encloses said rod.

Fig. 3 is a vertical section taken through the center of the float that is carried by the lower end of the calibrated rod.

Fig. 4 is a horizontal section taken on the line 4—4 of Fig. 3.

Fig. 5 is a perspective view of the resilient gripping element utilized for connecting the float to the calibrated rod.

Referring by numerals to the accompanying drawing which illustrates a preferred embodiment of my invention, 10 designates a tube of small diameter preferably formed of metal, open at both ends, and extending from the upper end of said tube to a point adjacent its lower end is a narrow slot 11. The calibrated member 12 that is arranged to slide freely through the tube 10 is preferably formed of metal and square or non-circular in cross section. This member 12 may be formed from a metal rod although in order to minimize the weight of the device, I prefer to form said rod from metal tubing, preferably stainless steel, square in cross section. Where the rod is formed of tubing, the ends thereof are plugged or closed so as to increase the buoyancy of said rod. In some instances, the rod 12 may be formed of wood, Bakelite, or any other suitable material.

One of the faces of the member 12 is marked with properly spaced and designated graduations so as to indicate gallons or fractional portions thereof and these markings or graduations, it will be understood, must be arranged so as to bear proper relation to the capacity of the barrels, kegs, or other containers that are to be gauged.

Secured to the lower end portion of the graduated member 12 is a float 13 which may be of cork, balsa wood, or other light weight material and the means utilized for securing this float to the rod is a one piece resilient gripping member illustrated in Fig. 5.

This element is formed from a strip of thin metal having a substantial degree of resiliency and the central portion of said strip is bent to form an open loop 14 shaped so as to surround and grip the square or non-circular rod 12. The split or opening in this loop has an appreciable width and the loop is formed so that it tends to contract and thus, when said loop is applied to the rod it grips the same with friction developed as a result of the normal tendency of the loop to contract.

From the split or opening in this loop, portions of the metal forming the gripping element are extended outwardly parallel with each other to form short portions 15 that extend through the slot 11 in tube 10 and, from the outer ends of these short outwardly projecting portions the end portions of the strip of metal are bent into substantially semi-circular form to form oppositely curved arms 16 that normally tend to expand or spread apart.

Formed through the float 13 is an axial opening 17 that is slightly larger in diameter than tube 10 and the resilient arms 16 bear against the surface of the body of the float surrounding this opening 17 and, as said arms tend to flex outwardly or spread apart they engage and grip the float with friction and pressure.

As a result of the construction just described, the float is mounted on the lower portion of the rod 12 without involving the use of pins, screws, rivets, or like fastening devices, and without the use of solder or adhesive.

In the use of my improved gauge, the bung or other closure is removed from the barrel and the gauge is inserted through the bung hole or other opening in said barrel until the lower end of the tube 11 rests on that portion of the barrel directly opposite the bung hole and float 13 will, due to its buoyancy, maintain a position on the surface of the liquid within the barrel.

The graduated rod 12 being connected to the float will be held in position with its upper portion projecting above the upper end of tube 10 and the reading of the graduated mark that appears in line with or just above the upper end of tube 10 will denote the liquid contents within the barrel or other container.

In some instances, it may be found desirable to mount the float on the tube 10 that encloses the rod so that, when the device is used the tube will be elevated with respect to the rod and the lower end of the latter resting on the bottom of the barrel or other container while the device is being used.

Thus it will be seen that I have provided a barrel gauge that is relatively simple in construction, inexpensive of manufacture and very effective in performing the functions for which it is intended.

It will be noted that my improved barrel gauge comprises only four parts, namely, the slotted tube, the calibrated rod, the float, and the one piece gripping element that acts automatically to provide a firm gripping engagement between the graduated rod and the float without requiring the use of extraneous fastening means.

It will be understood that minor changes in the size, form and construction of the various parts of my improved barrel gauge, may be made and substituted for those herein shown and described, without departing from the spirit of my invention, the scope of which is set forth in the appended claims.

I claim as my invention:

1. In a barrel gauge, the combination with a tube provided with a longitudinally disposed slot, a rod arranged for telescopic movement in said tube and a float having an opening through which said tube passes, of a connecting member formed from a single piece of resilient material having its intermediate portion shaped so as to encircle and fit snugly upon said rod, the end portions of said connector being shaped to fit snugly against the surface of the float within the opening therein and which end portions are connected to the rod encircling portion through the slot in said tube.

2. In a barrel gauge, the combination with a tube provided with a longitudinally disposed slot, a rod arranged for telescopic movement in said tube and a float having an opening through which said tube passes, of a connecting member for said rod and float, which connecting member is formed from a narrow strip of thin material having its central portion shaped so as to encircle said rod and the encircling portion having inherent strains that tend to contract and grip said rod and the end portions of said strip of material being shaped so as to fit the inner surface of the opening through said float and having inherent strains that tend to expand said float engaging portions.

WILLIAM A. KUHLMAN.